US012637641B2

(12) United States Patent

Roach

(10) Patent No.: US 12,637,641 B2

(45) Date of Patent: May 26, 2026

---

(54) ACTIVE CARBONATION PRESSURE MONITORING CAP

(71) Applicant: Mickel Roach, Safety Harbor, FL (US)

(72) Inventor: Mickel Roach, Safety Harbor, FL (US)

(*) Notice: Subject to any disclaimer, the term of this patent is extended or adjusted under 35 U.S.C. 154(b) by 964 days.

(21) Appl. No.: 17/664,785

(22) Filed: May 24, 2022

(65) Prior Publication Data

US 2023/0407214 A1 Dec. 21, 2023

(51) Int. Cl.

| *C12C 11/00* | (2006.01) |
| *B65D 41/02* | (2006.01) |
| *C12G 3/02* | (2019.01) |
| *F16K 15/14* | (2006.01) |

(52) U.S. Cl.

CPC ............ *C12C 11/006* (2013.01); *B65D 41/02* (2013.01); *C12G 3/02* (2013.01); *F16K 15/148* (2013.01)

(58) Field of Classification Search

CPC ......... C12C 11/006; C12C 13/00; C12G 3/02; B65D 41/02; F16K 15/148; Y10T 137/789

See application file for complete search history.

(56) References Cited

U.S. PATENT DOCUMENTS

| 3,310,193 A | 3/1967 | Macpherson |
| 5,507,318 A | 4/1996 | Israelson |
| 5,702,018 A | 12/1997 | Montgomery |
| 7,302,971 B2 | 12/2007 | Myntti |
| 9,327,882 B2 | 5/2016 | Windmiller |

| 9,968,754 B2 | 5/2018 | Virr |
| 11,047,508 B2 | 6/2021 | Sanders et al. |
| 2005/0126649 A1 | 6/2005 | Onishi |

(Continued)

FOREIGN PATENT DOCUMENTS

| CN | 105836278 A | 8/2016 |
| CN | 206159566 U | 5/2017 |

(Continued)

OTHER PUBLICATIONS

Minivalve, "Umbrella Valves, Belleville Valves, How they work! (patent pending)," accessed Feb. 9, 2022, <http://minivalve.com/newsite/index.php/en/by-type/umbrella-valves/how-they-work>.

(Continued)

*Primary Examiner* — Steven W Crabb
*Assistant Examiner* — Dilnessa B Belay
(74) *Attorney, Agent, or Firm* — Definitive Patents, member Synchrony IP; Timothy D. Snowden

(57) ABSTRACT

Apparatus and associated methods relate to a fermentation monitoring apparatus configured to generate a visual indicia in a fluid well in response to pressure inside a vessel exceeding a predetermined pressure. In an illustrative example, the fermentation monitoring apparatus may include a vessel cap that includes a fluid well holding a quantity of fluid, and at least one fluid communication channel. The fluid well, for example, may receive gas released from the channel via the at least one fluid communication channel when the vessel cap is coupled to a first end of a vessel to define a chamber and a gas pressure in the chamber exceeds a predetermined threshold. Various embodiments may advantageously generate a visual indicium of gas bubbles in the quantity of fluid indicating to a user that the gas pressure in the chamber has exceeded the predetermined threshold.

16 Claims, 8 Drawing Sheets

(56) References Cited

U.S. PATENT DOCUMENTS

| | | | |
|---|---|---|---|
| 2005/0247661 A1 | 11/2005 | Robertson | |
| 2005/0257837 A1 | 11/2005 | Bailey | |
| 2005/0284211 A1 | 12/2005 | Cram et al. | |
| 2009/0250465 A1 | 10/2009 | Martinez et al. | |
| 2016/0376075 A1 | 12/2016 | Bacher et al. | |
| 2017/0313481 A1 | 11/2017 | Kim | |
| 2018/0162717 A1 | 6/2018 | Manwani et al. | |
| 2019/0106660 A1* | 4/2019 | Geiger | C12C 11/006 |
| 2019/0219183 A1 | 7/2019 | Hall-Snyder et al. | |
| 2021/0388911 A1 | 12/2021 | Caya et al. | |

FOREIGN PATENT DOCUMENTS

| | | | |
|---|---|---|---|
| CN | 206530743 | U | 9/2017 |
| GB | 2249084 | A | 4/1992 |
| JP | 2012059804 | A | 3/2012 |
| KR | 20200099687 | A | 8/2020 |
| WO | 1999050383 | A2 | 10/1999 |
| WO | 2000029297 | A1 | 5/2000 |
| WO | 2009033313 | A1 | 3/2009 |
| WO | 2021107780 | A1 | 6/2021 |
| WO | 2023230066 | A1 | 11/2023 |

OTHER PUBLICATIONS

MoreFlavor, "PLAATO Airlock—WiFi Fermentation Analyzer," MoreBeer, accessed Jan. 6, 2022, <https://www.morebeer.com/products/plaato-airlock-wifi-fermentation-analyzer.html>.

Paul_E, "Fermentation Bubble Counter," The Automated Android Brewery, Nov. 10, 2014, (accessed Jan. 7, 2022), <http://brew.ellams.com/fermentation-bubble-counter/>.

International Search Report and Written Opinion of the International Searching Authority in related International Application No. PCT/US2023/023242, dated Nov. 2, 2023, 19 pages.

Examiner Informal Remarks in related International Application No. PCT/US2023/023242, dated Aug. 7, 2024, 7 pages.

Intermediate Formal Response under Rule 66 in related International Application No. PCT/US2023/023242, dated Aug. 14, 2024, 2 pages.

International Preliminary Report on Patentability in related International Application No. PCT/US2023/023242, dated Sep. 2, 2024, 9 pages.

Response Under Rule 66 in related International Application No. PCT/US2023/023242, dated Aug. 19, 2024, 47 pages.

Written Opinion of the International Preliminary Examining Authority in related International Application No. PCT/US2023/023242, dated Jun. 7, 2024, 12 pages.

* cited by examiner

ACTIVE CARBONATION PRESSURE MONITORING CAP

TECHNICAL FIELD

Various embodiments relate generally to fermentation and carbonation apparatus.

BACKGROUND

Humans have used fermentation to produce foodstuffs and beverages since thousands of years ago. For example, some food preservation process may use fermentation in a process that produces lactic acid. Some examples of fermented food are pickled cucumbers, kombucha, kimchi, and yogurt. In some examples, fermentation may also be used for producing alcoholic beverages such as wine and beer.

In some examples, fermentation is a metabolic process that produces chemical changes in organic substrates through the action of enzymes. In food production, for example, fermentation may refer to a process in which the activity of micro-organisms (e.g., probiotic culture, yeast, and/or inoculant) brings about a desirable change to a foodstuff or beverage.

Carbonated drinks may be made from a fermentation process where yeast or other fermentation culture is added to a fermenting liquid (e.g., juice) to cause carbonation. In some examples, carbonation may occur when yeasts consume sugar in a juice and output carbon dioxide. When the carbon dioxide is contained, for example, in a bottle, the carbon dioxide may build up in the bottle and turns into bubbles in the fermenting liquid. As a result, gas pressure may vary during the fermentation process.

SUMMARY

Apparatus and associated methods relate to a fermentation monitoring apparatus configured to generate a visual indicia in a fluid well in response to pressure inside a vessel exceeding a predetermined pressure. In an illustrative example, the fermentation monitoring apparatus may include a vessel cap that includes a fluid well holding a quantity of fluid, and at least one fluid communication channel. The fluid well, for example, may receive gas released from the channel via the at least one fluid communication channel when the vessel cap is coupled to a first end of a vessel to define a chamber and a gas pressure in the chamber exceeds a predetermined threshold. Various embodiments may advantageously generate a visual indicium of gas bubbles in the quantity of fluid indicating to a user that the gas pressure in the chamber has exceeded the predetermined threshold.

Various embodiments may achieve one or more advantages. For example, some embodiments may include an umbrella valve which may advantageously enable a (predetermined) pressure of fermentation to be reached before a visual indicium is generated.

Some embodiments, for example, may advantageously include a removable tasting module. Such embodiments may, for example, advantageously enable a user to taste test contents in the chamber without contamination.

For example, some embodiments may advantageously include a residue collection module. The collection module may, for example, advantageously enable a user to remove selective residue from the chamber without contamination of the (fermenting) contents.

Some implementations may, for example, advantageously include a secondary seal. The secondary seal may, for example, advantageously allow long term storage of a fermented content in a same bottle used for fermentation. Some implementations may, for example, include a mobile application to advantageously log various environmental parameters of the fermenting content over time against one or more predetermined profile associated with a user-selected flavor The details of various embodiments are set forth in the accompanying drawings and the description below. Other features and advantages will be apparent from the description and drawings, and from the claims.

BRIEF DESCRIPTION OF THE DRAWINGS

FIG. 1 depicts an exemplary Fermentation Monitoring System (FMS) employed in an illustrative use-case scenario.

Like reference symbols in the various drawings indicate like elements.

DETAILED DESCRIPTION OF ILLUSTRATIVE EMBODIMENTS

Figure 2:
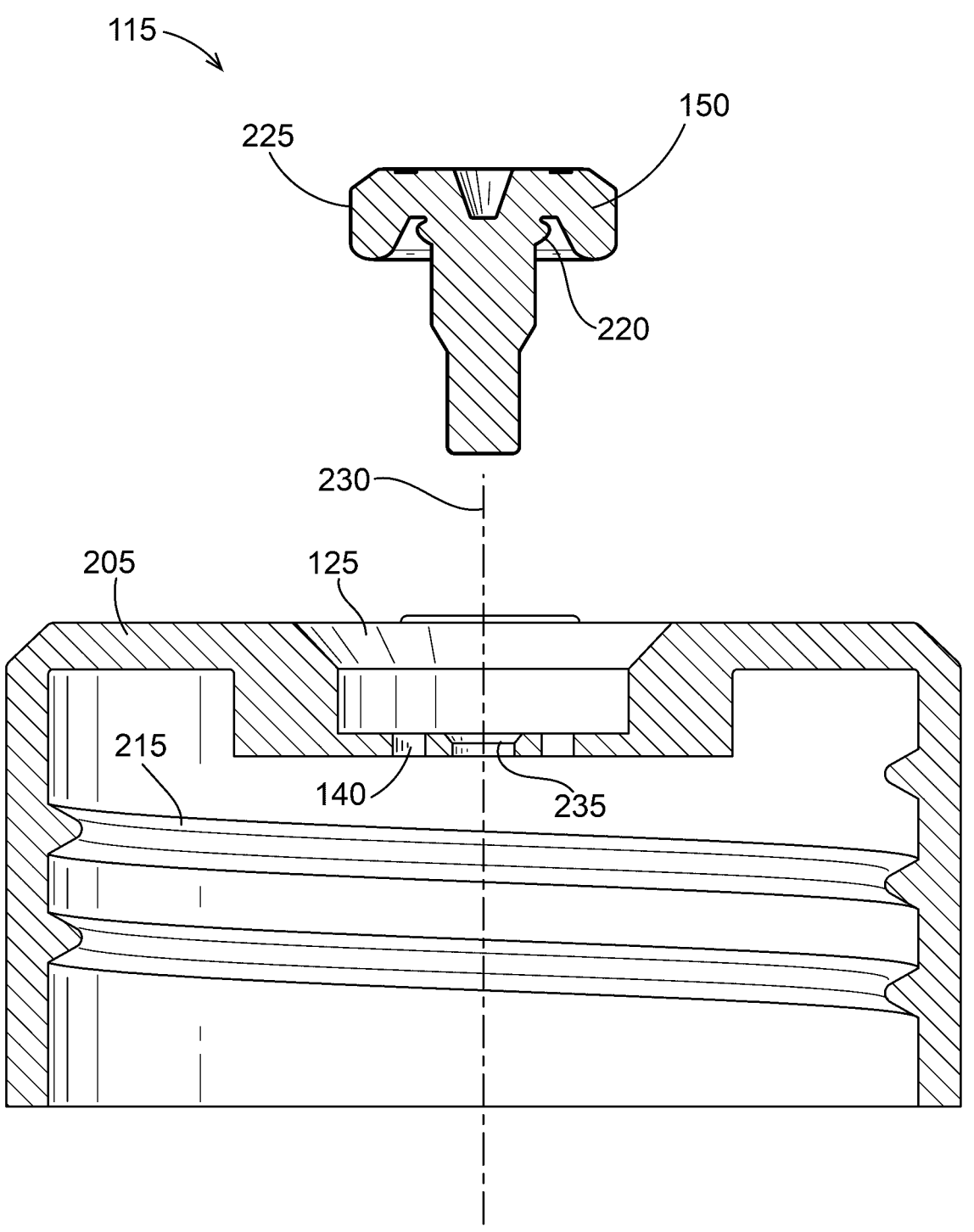
FIG. 2 is a cross-section view of an exemplary fermentation monitoring cap (FMC).

To aid understanding, this document is organized as follows. First, to help introduce discussion of various embodiments, a fermentation monitoring system (FMS) is introduced with reference to FIGS. 1-2. Second, that introduction leads into a description with reference to FIGS. 3-4 of some exemplary embodiments of fermentation monitoring caps (FMC) of the FMS. Finally, the document discusses further embodiments, exemplary applications and aspects relating to FMS.

Figure 1:
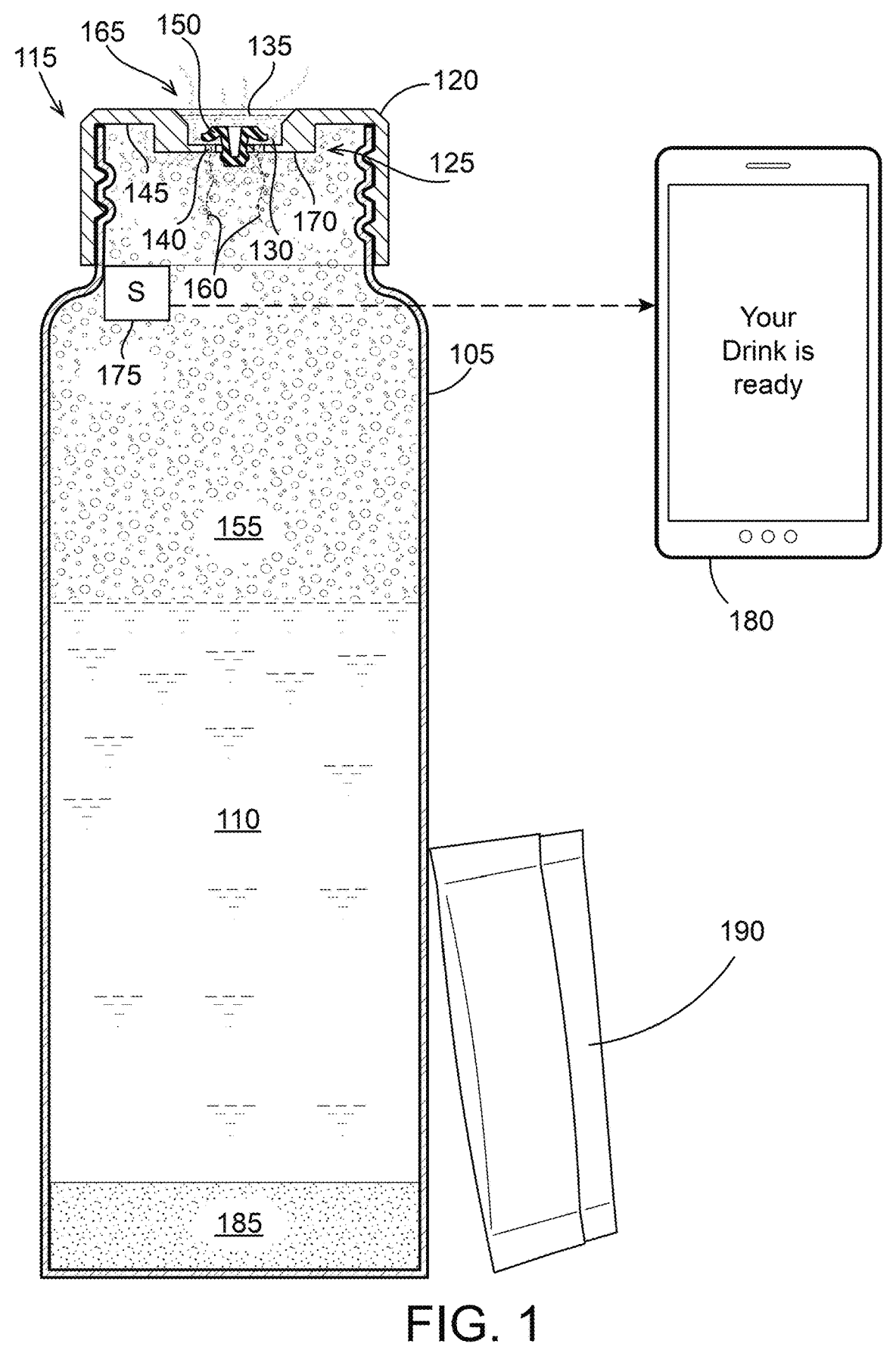

FIG. 1 depicts an exemplary Fermentation Assist System (FAS 100) employed in an illustrative use-case scenario. For example, a user may use the FAS 100 to brew a drink at home by a fermentation and/or a carbonation process. As an illustrative example, a fermentation-based carbonation process maybe performed using the FAS 100. In this example, the FAS 100 is brewing a fermenting beverage 110 contained in a bottle 105. Various liquid is applicable to the FAS 100. For example, the fermenting beverage 110 may be a fermentation fruit juice. For example, the fermentation beverage 110 may be apple juice, pineapple juice, grape juice, other fruit juice, or a mixture thereof. In some examples, the beverage 110 may be kombucha.

In the depicted example, the FAS 100 includes a fermentation monitoring cap (FMC 115). The FMC 115 includes atop surface 120 and a fluid well 125 defined by a well floor 130 at a lower elevation than the top surface 120. In some implementations, the fluid well 125 may contain various kind of viewing fluid 135. For example, the viewing fluid 135 may be water. In some examples, the viewing fluid 135 may be a colored solution. In various implementations, in operation, the viewing fluid 135 may provide a visual indication when the fermentation beverage 110 has met a predetermined condition in a fermentation process.

The FMC 115 includes, in this example, two fluid communication channels 140 at the well floor 130 to an interior surface 145 of the FMC 115. The fluid communication channels 140 are, as shown in FIG. 1, covered by an umbrella valve 150. In some implementations, the umbrella valve 150 may be preloaded with a predetermined tension upon insertion into the FMC 115. For example, the umbrella valve 150 may include a retention bulb that, when relaxed, rest in a plane above a plane of a diaphragm of the umbrella valve 150. Upon insertion to the FMC 115, for example, a tension may be applied to the retention bulb such that a predetermined force may be required to remove the umbrella valve 150 from the FMC 115.

In operation, as depicted in FIG. 1, the FMC 115 is coupled to the bottle 105. For example, the FMC 115 may be releasably threaded to a top opening of the bottle 105. In this example, the bottle 105 and the interior surface 145 formed an enclosed chamber 155. For example, the fermenting beverage 110 may start the fermentation process in the enclosed chamber 155.

In some implementations, the umbrella valve 150 may selectively block air and/or gas flow through the fluid communication channels 140. For example, by selecting a predetermined release pressure of the umbrella valve 150, the fluid communication channels 140 may be set to be unblocked at a predetermined pressure threshold. In some implementations, by way of example and not limitation, the predetermined release pressure of the umbrella valve 150 may be above 25 psi.

During the fermentation process, for example, the fermenting beverage 110 may release gas. For example, the enclosed chamber 155 may experience increasing gas pressure during the fermentation process. In some implementations, when the gas pressure in the enclosed chamber 155 exceeds the predetermined threshold, the gas pressure may force open the fluid communication channels 140 and some escaping gas 160 within the enclosed chamber 155 may escape into the fluid well 125 through the fluid communication channels 140 into the viewing fluid 135. In some examples, the escaping gas 160 may appear as gas bubbles 165 in the viewing fluid 135. In various implementations, the gas bubbles 165 may provide visual indication to the user that the gas pressure has exceeded the predetermined threshold. Accordingly, for example, the user may be visually informed that the fermentation process has met a predetermined condition.

In various implementations, the FAS 100 may advantageously be a safe starter kit for home carbonation/fermentation of juice with automatic pressure release. For example, the FAS 100 may include juice, fermentation catalyst (e.g., inoculant/fermentation culture/probiotic culture), and the FMC 115. In some examples, the FAS 100 may advantageously allow the user to ferment a beverage without constant monitoring to avoid over-pressurization and/or explosion of the fermentation container. In some embodiments, the FMC 115 may advantageously allow bottling of active beverages by avoiding over pressurization.

In various implementations, because the user may select the umbrella valve 150 with a sufficiently high predetermined pressure threshold, the FAS 100 may advantageously allow high pressure fermentation. For example, the fermenting beverage 110 may carbonate and ferment at the same time. Accordingly, the fermenting beverage 110 may, for example, be brewed pre-primed with carbonation during a primary fermentation process. In some examples, in a high-pressure fermentation process, oxygen may be evacuated from the fermenting beverage 110 (e.g., to prevent growth of undesired organisms, such as mold).

In some implementations, the FMC 115 further includes a semi-permeable membrane 170 placed over a vent of the fluid communication channel 140. The semi-permeable membrane 170 may, for example, allow the escaping gas 160 to pass through when the umbrella valve opens, while preventing spillage of the fermenting beverage 110. The semi-permeable membrane 170 may, for example, advantageously enable transportation of the fermenting beverage 110. For example, the fermenting beverage 110 may be transported for distribution to grocery stores without spillage. In some embodiments, the semi-permeable membrane 170 may be a gas-permeable, liquid impermeable membrane that is at least partially transparent. For example, the semi-permeable membrane 170 may allow visualization of the fluid well 125 while preventing spillage of fluid from the fluid well 125.

In some implementations, a semi-permeable membrane (not shown) may be placed over the fluid well 125. The membrane may, by way of example and not limitation, be a membrane such as depicted with respect to the semi-permeable membrane 170. The membrane may, for example, allow the escaping gas 160 to pass through, while preventing the viewing fluid 135 from escaping the fluid well 125 (e.g., spilling out if the container is tipped). Such implementations may, for example, advantageously allow monitoring of the fermentation via the viewing fluid 135 (e.g., visually monitoring for the escaping gas 160), but may prevent the viewing fluid 135 from spilling during transport and/or accidentally (e.g., by getting tipped in a refrigerator). Such implementations may, for example, advantageously enable the cap to be removed without spilling the viewing fluid 135. In some implementations, the membrane may be optically translucent (e.g., such that the viewing fluid 135 is visible through the membrane). In some implementations, the membrane may be substantially optically transparent (e.g., visually clear).

In some implementations, the FMC 115 may include one or more sensors 175. For example, the sensor may be a temperature sensor. In some examples, the sensor may be a pressure sensor. The sensors 175 may, for example, wirelessly communicate with a mobile computing device 180 running an app. In some implementations, the app may log temperature vs time, for example. In some examples, the app may compare the time and temperature to one or more predetermined profiles (e.g., for a user-selected flavor profile). For example, the predetermined profiles may indicate the temperature and pressure profile for the fermenting beverage 110 to have a user-selected taste. In some implementations, the predetermined profiles may be downloadable from the Internet. Upon determining that the fermenting beverage match the predetermined profiles, the app may, for example, generate alerts. For example, the app may generate an audio and/or visual alert to notify the user to check the fermenting beverage 110 when a predetermined change in temperature has happened in a predetermined range of time.

In this example, the FAS 100 further includes a false bottom 185. For example, the false bottom 185 may include a valve to remove dead yeast from the fermenting beverage 110 without contaminating the fermenting contents.

In this example, the FAS 100 further includes a self-dispensing culture package 190. The self-dispensing culture package 190 may, for example, be disposed in the bottle 105 pre-activated initially. In some examples, the package may be activated based on a predetermined operation (e.g., removing a seal, pushing a plunger) from the outside of the bottle 105. Such embodiments may, for example, make dispensing a fermentation culture into the fermenting beverage 110 easier and/or faster. Various such embodiments may advantageously reduce time and/or cost for foodservice and/or supermarket retailers of actively fermenting beverages.

In various implementations, the FMC 115 may include the fluid well 125 and at least one fluid communication channel 140. When the FMC 115 is coupled to the bottle 105 containing the fermenting beverage 110, and the gas pressure within the enclosed chamber 155 exceeds a predetermined threshold, the escaping gas 160 may flow into the fluid well 125 through the fluid communication channels 140 to provide visual indication to the user that the gas pressure has exceeded the predetermined pressure threshold.

FIG. 2 is a cross-section view of an exemplary FMC 115. In this example, the FMC 115 includes a vessel cap 205 and an umbrella valve 150. As shown in FIG. 2, the vessel cap 205 includes threads 215 for coupling with the bottle 105. For example, in operation, the escaping gas 160 may escape from the enclosed chamber to the fluid well 125 via the fluid communication channels 140.

The umbrella valve 150 includes a retention module 220 (e.g., a retention bulb, as depicted) and a substantially circular diaphragm 225. As shown, the umbrella valve 150 may be releasably inserted along an axis 230 into a valve receiving aperture 235. In some examples, an outer circumference of the diaphragm 225 defining a first plane. In some implementations, the retention module 220 may be at rest above the first plane. In this example the retention module 220 is resting within the diaphragm. Accordingly, when the retention bulb is inserted through the valve receiving aperture 235. For example, the outer circumference of the diaphragm 225 may come in contact with a wall of the fluid well 125. For example, the insertion may apply a preloading pressure to the diaphragm based on an elasticity of the retention module 220. In various implementations, the umbrella valve 150 may be 70-45 shore A. In some examples, various hardness may indicate a different predetermined pressure to unblock the fluid communication channels 140. In some implementations, the umbrella valve 150 may be replicable to fit a required predetermined threshold for the fermenting beverage 110. In some implementations the preloaded insertion of the umbrella valve 150 may, for example, advantageously enable application of an umbrella valve to a thin wall.

In some implementations, the preloading pressure may be determined by a thickness of the valve receiving aperture 235. As an illustrative example, the valve receiving aperture 235 may, by way of example and not limitation, be at least 3.5 mm wide. The valve receiving aperture 235 may, by way of example and not limitation, be up to 5 mm wide. In some implementations, a thickness of valve receiving aperture may, for example, be at least 0.9 mm. As an illustrative example, the valve receiving aperture 235 may, by way of example and not limitation, be up to 1.2 mm thick. In some examples, if the thickness is increased (e.g., thereby increasing a separation between the retention module 220 and the umbrella valve 150), the valve receiving aperture 235 may be stretched more. For example, the predetermined pressure to unblock the fluid communication channels 140 may exceed a default value of the umbrella valve 150. For example, the umbrella valve 150 with lower hardness may advantageously be configured to increase an unblock pressure of the fluid communication channels 140. In some implementations, the umbrella valve 150 extending down past a default "pre-loaded" length may increase the predetermined pressure.

Figure 3:
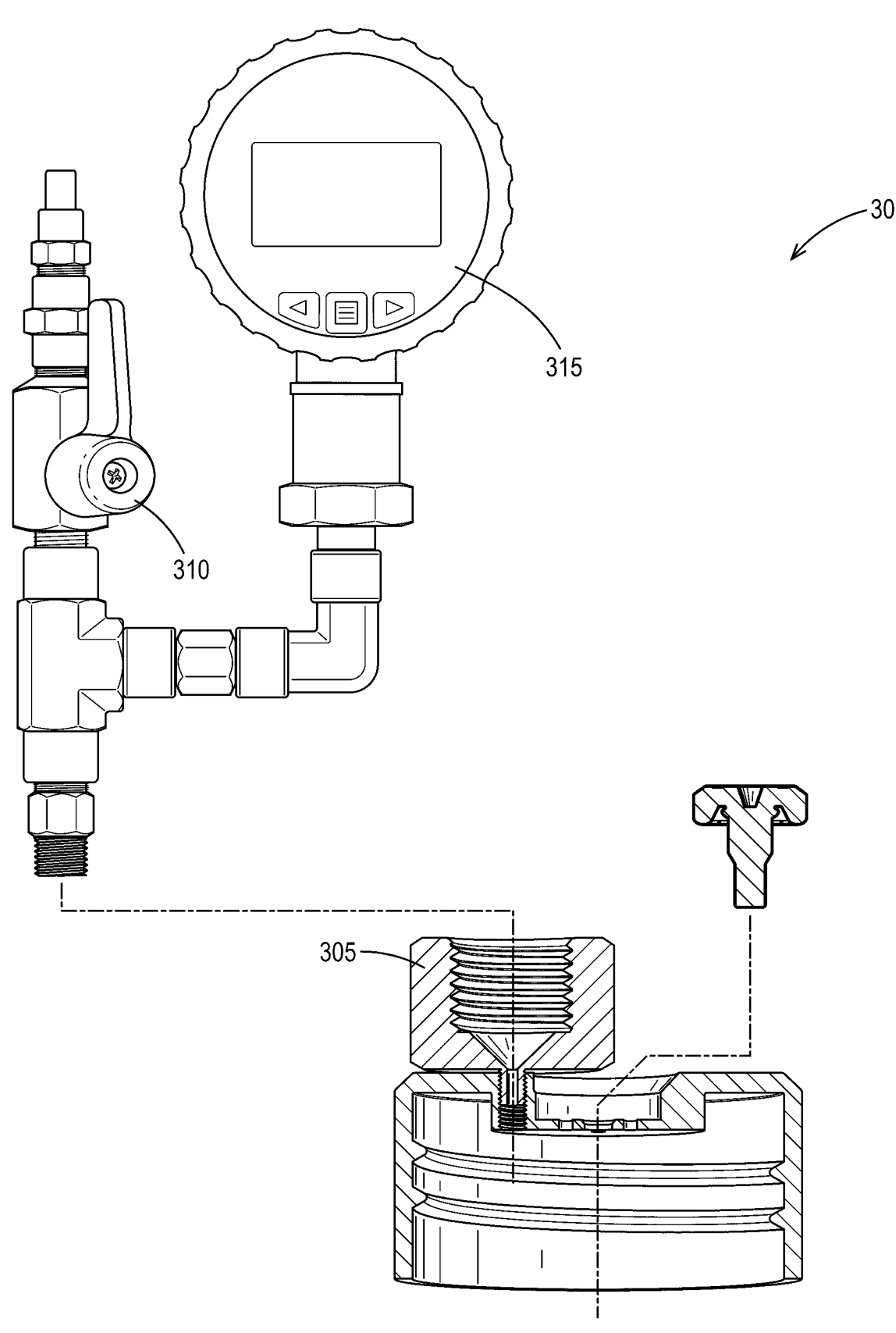
FIG. 3 is a cross-section view an exemplary FMC with a removable tasting module.

FIG. 3 is a cross-section view an exemplary FMC 300 with a removable tasting module 305. For example, the removable tasting module 305 may be a screw port at the top of the FMC 300. In some examples, a user may desire to taste the fermenting beverage 110 to check a progress of the fermentation process. For examples, the user may desire to confirm that no alcoholic content is developing in the fermenting beverage 110. In some examples, the user may remove a portion of the fermenting beverage 110 via the removable tasting module for tasting. In various implementations, the removable tasting module 305 may advantageously allow the user to taste the fermenting beverage 110 without contaminating content of the fermenting beverage 110.

The FMC 300 includes, in this example, a shut off valve 310 (e.g., a Schrader valve) and a gauge 315. For example, the shut off valve 310 and the gauge 315 may be screwed into the top via the removable tasting module 305. In some implementations, the shut off valve 310 may operate the removable tasting module 305. The gauge 315 may, for example, enable measurement of an internal pressure within the bottle 105.

Figure 4:
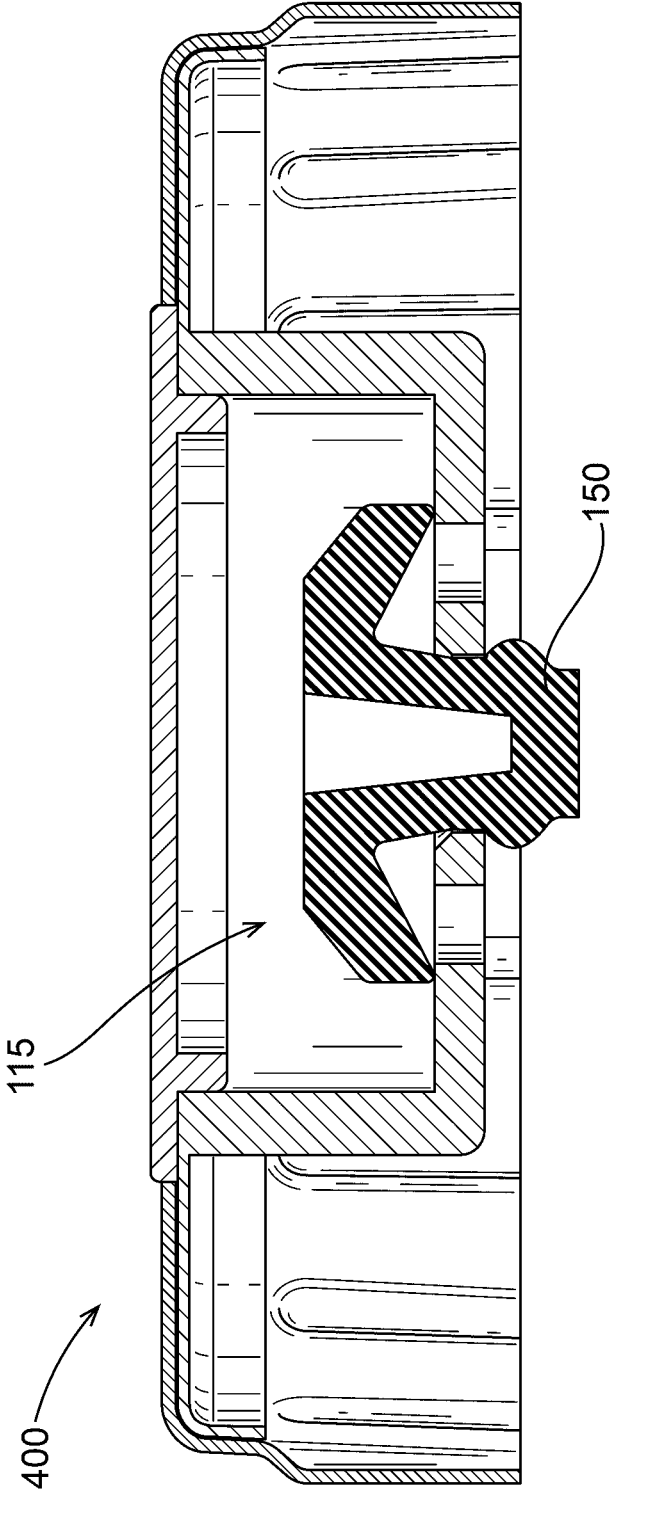
FIG. 4 is a cross-section view an exemplary FMC with a secondary seal.

FIG. 4 is a cross-section view an exemplary FMC 115 with a secondary seal 400. In this example, the secondary seal 400 is a crown-cap shaped cover to the FMC 115. For example the secondary seal 400 may fixedly seal the FMC 115 and the bottle 105 with welding solvent, epoxy, and/or other sealing agent. In some implementations, the secondary seal 400 may seal the FMC 115 and the umbrella valve 150 to seal the beverage away from an outside environment. For example, the secondary seal 400 may advantageously allow long term storage of the fermented beverage 110 in the same bottle 105 used for fermentation.

In some embodiments, the secondary seal 400 may be applied once a fermentation process is substantially completed. For example, the secondary seal 400 may be applied after the fermentation process has been started for 7 days, for example.

Figure 5:
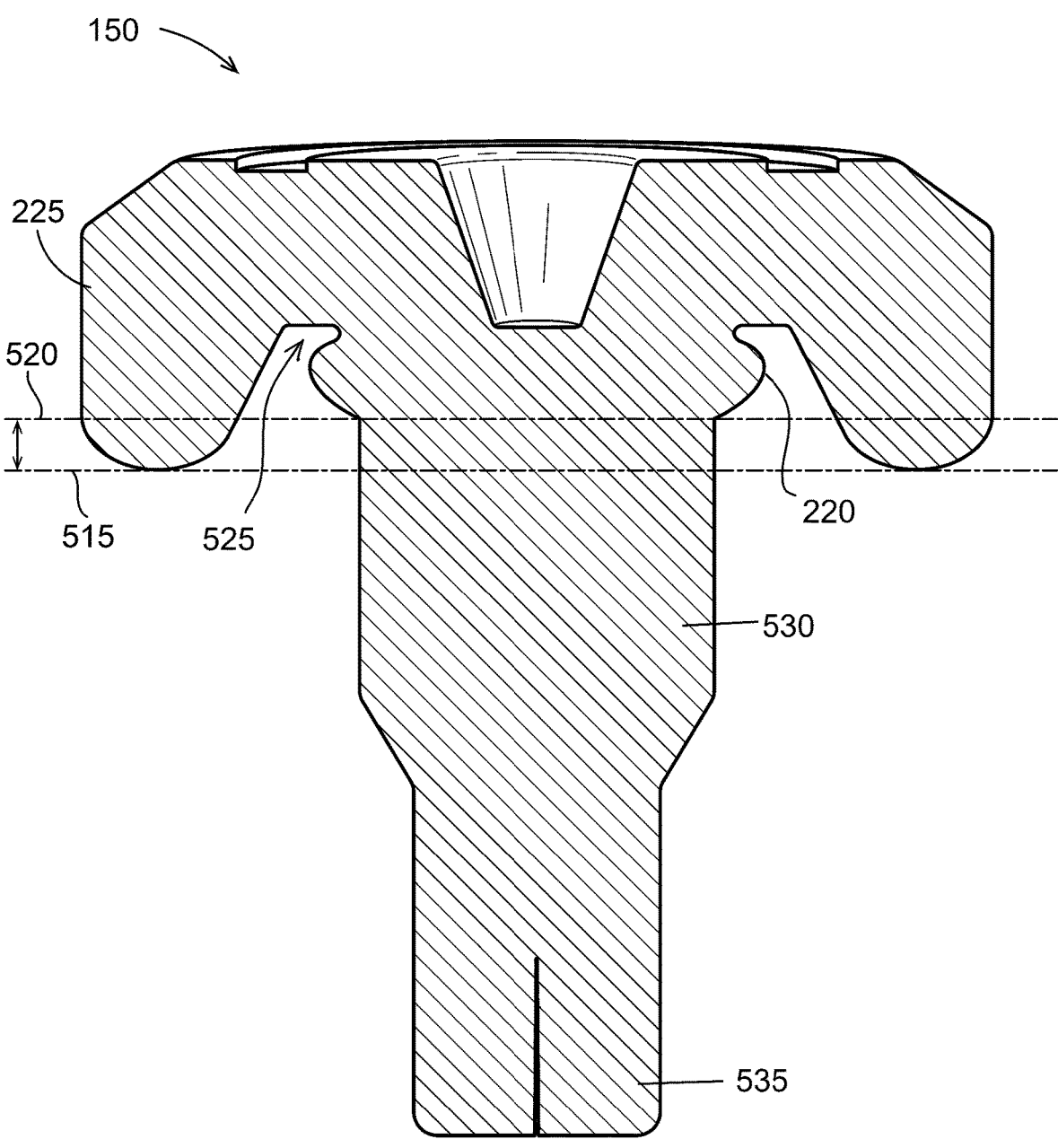
FIG. 5 shows an exemplary umbrella valve having a pre-loading retention module in a non-deployed mode.

FIG. 5 shows an exemplary umbrella valve 500 having a (pre-loading) retention module 220 in a non-deployed mode. For example, the umbrella valve 500 may be used in the fluid well 125 for assisting fermentation. In this example, the umbrella valve 500 includes a diaphragm 225 at an outer circumference. The outer circumference of the diaphragm 225 rests on a first plane 515. In the non-deployed mode, for example, the retention module 220 is resting at a second plane 520 that, as shown is at a higher elevation than the first plane 515. When the umbrella valve 500 is being deployed, for example, a predetermined pre-loading force may be applied to pull the retention module 220 below the first plane 515.

In some implementations, the umbrella valve 500 may be deployed into the fluid well 125 by applying a predetermined force associated with the hardness of the retention module 220. In some examples, a predetermined tension may be applied to pull the retention module 220 through a wall of the fluid well 125. In some implementations, the predetermined tension may keep the diaphragm 225 substantially sealing with a thin wall of the fluid well 125.

For example, in operations, when the umbrella valve 500 is in the deployed mode operates, the umbrella valve 500 may substantially blocks the flow communication channels 140. For example, the umbrella valve 500 may maintain a gas pressure within the chamber 155. In some examples, when the gas pressure in the chamber 155 may exceed a predetermined threshold (e.g., 30 psi), the gas pressure may generate a force greater than the predetermined tension of the retention module 220. In some implementations, the umbrella valve 500 may be transiently open. For example, the umbrella valve 500 may temporarily open the flowing communication channels 140 to reduce the gas pressure. In some implementations, the umbrella valve 500 may advantageously maintain the gas pressure within the chamber 155 at the predetermined threshold.

The umbrella valve 150 includes a thin hollow area 525 for contacting the well floor 130. In some implementations, the thin hollow area 525 may be configured to be thin to create a hollow cavity with the well floor 130. For example, a greater area covered by the hollow cavity may be configured such that a higher gas pressure may be required to push up on the umbrella valve 150.

In this example, the umbrella valve 150 includes a valve stem 530. The valve stem 530 includes a tapering tip 535 configured to be tapered thinner into the receiving aperture 235. For example, the tapering tip 535 may allow the umbrella valve 150 to fit through a small valve receiving aperture 235 (e.g., 3.5 mm). In some implementations, the valve stem 530 may, in some portion, thicker than a diameter of the valve receiving aperture 235. In some examples, when the umbrella valve 150 is inserted through the valve receiving aperture 235, a higher friction force may be generated to hold the retention module 220 into place.

For example, a diameter of the receiving aperture 235 may be D1, a diameter of the tapering tip 535 may be D2, and a diameter of the valve stem 530 just above the receiving aperture 235 may be D3. In some implementations, D2<D1<D3. For example, D1 may be 3.5 mm. D2 may, for example, be 3 mm. D3 may, for example, be 4.5 mm. Accordingly, the tapering tip 535 may be inserted into the receiving aperture 235 (e.g., for alignment and/or to enable a user to 'grip' the valve to pull it through the hole). The valve stem 530 may then require an interference fit such that a force of friction between the vessel cap 205 and the valve stem 535 and/or the retention module 220 may, for example, advantageously prevent dislodgement of the valve from the vessel cap 205.

In some examples, depending on the content for fermentation (e.g., a carbonated orange juice versus a Kombucha), the predetermined tension required may vary. In some implementations, the umbrella valve 500 with different predetermined tension may be replaceably (e.g., interchangeably, releasably) coupled to the fluid well 125.

Figure 6:
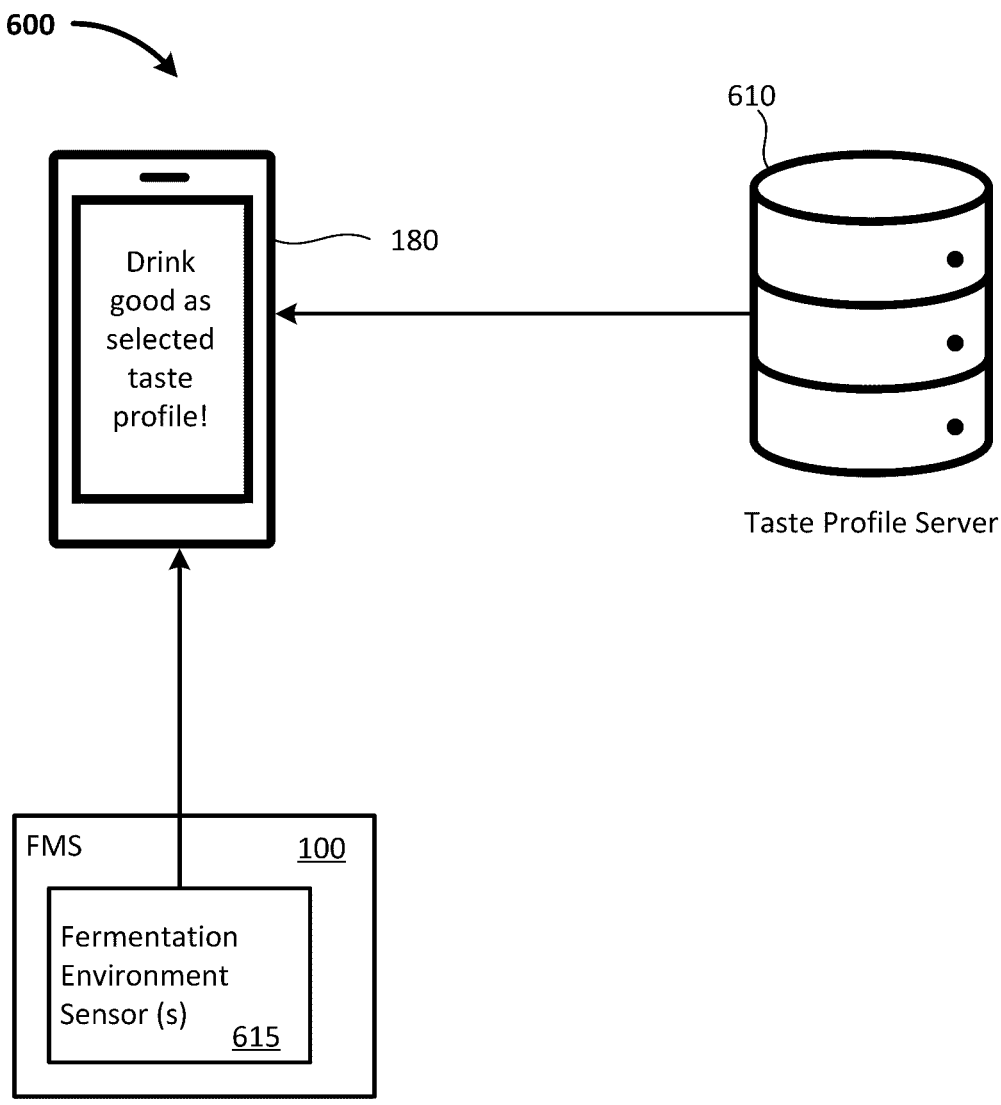
FIG. 6 is a block diagram showing an exemplary fermentation system for taste monitoring.

FIG. 6 is a block diagram showing an exemplary fermentation system 600 for taste monitoring. The fermentation system 600 includes the FAS 100, a mobile device 180, a taste profile server 610. As shown in this example, the FAS 100 includes one or more fermentation environment sensors (FES) 615. In some implementations, the FES 615 may be monitoring various environmental parameters associated with the fermenting beverage 110. For example, the FES 615 may include temperature sensors, humidity sensors, pressure sensor, light sensor, gas content sensor, and/or other sensor capable of obtaining environmental reading related to the fermenting beverage 110.

The mobile device 180 may receive the data transmitted from the FES 615. In some implementations, the mobile device 180 may include a mobile app for receiving the data from the FES 615. In this example, the mobile device 180 also receives taste profile data from the taste profile server 610. For example, the taste profile server 610 may include taste profiles associated with a tasting result of a fermenting content (e.g., a fermenting beverage or a fermenting food). In some implementations, the taste profile may include a data structure of environmental parameters at different time points of a specific fermentation content. In some examples, the taste profile may be associated with a guideline (e.g., general guideline, predetermined guidelines) of attributes at different times to get a user-selected taste or texture of the specific fermentation content.

In some implementations, the FES 615 may be setup to monitor environmental attributes of interest related to the taste profiles. In some implementations, a user may select a predetermine taste profile. For example, the mobile app may provide a list of available taste profiles from the taste profile server 610. In some implementations, based on a user-selected taste profile, the mobile app may compare the historical readings from the FES 615 to determine one or more reminders for the user. For example, based on the historical reading of temperature of the fermentation beverage 110, the mobile app may notify the user to check on the fermenting beverage 110 at an appropriated time. In some implementations, the mobile app may notify the user to change a temperature of the fermenting beverage 110 to achieve the user-selected taste profile.

In some implementations, the mobile app may also record the environmental attributes to create new taste profile. For example, after a fermenting beverage is created, the user may choose to upload the historical environmental attributes to the taste profile server 610 as a new taste profile.

Figure 7:
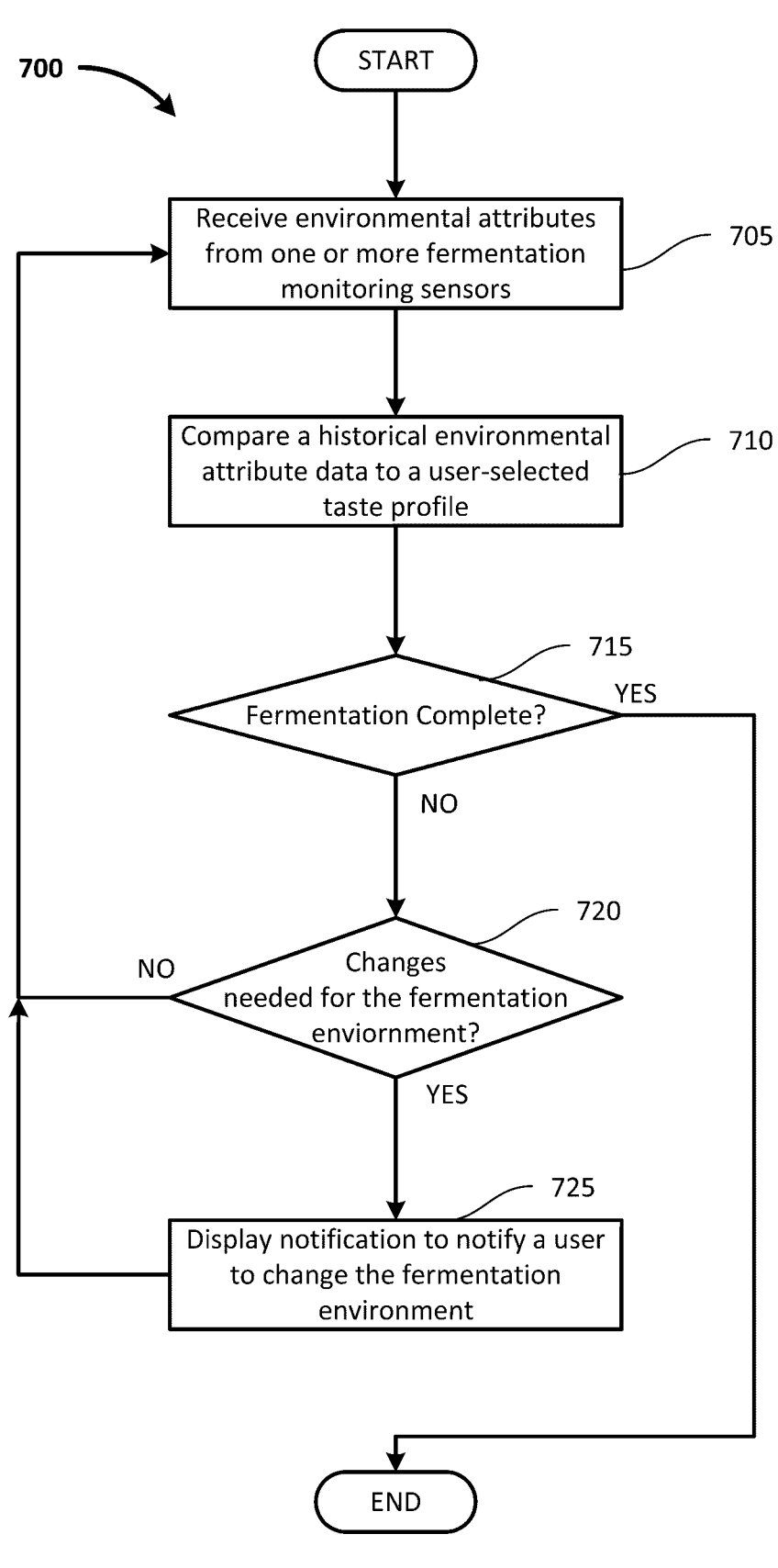
FIG. 7 is a flow diagram showing an exemplary taste monitoring method using the FMS.

FIG. 7 is a flow diagram showing an exemplary taste monitoring method 700 using the FAS 100. For example, the monitoring method 700 may be executed by the mobile device 180 in the fermentation system 600. In this example, the method 700 starts when environmental attributes are received from one or more fermentation monitoring sensors in a step 705. For example, the mobile device 180 may receive temperature data from the temperature sensor 175.

Upon receiving the environmental attributes, a historical environmental attribute data is compared to a user-selected taste profile 710. For example, the user-selected taste profile may be retrieved from the taste profile server 610 and displayed for user selection. In some examples, the user-selected taste profile may be selected at the beginning of a fermentation process. In some implementations, a user may be allowed to switch the user-selected taste profile during the fermentation process.

In this example, after step 710, it is determined whether a fermentation is completed 715. For example, the mobile app may compare the environmental attributes a set of fermentation completion criterion to determine that the fermentation is completed. If it is determined that a fermentation is completed, then the method 700 ends. If it is determined that a fermentation is not completed, then it is determined whether one or more changes are needed for the fermentation environment 720. For example, the mobile app may determine that a lower temperature is needed for achieving the user-selected taste profile. If it is determined that one or more changes are needed for the fermentation environment, in this example, a notification is displayed to notify a user to change the fermentation environment 725. If it is determined that no change is needed for the fermentation environment, the method 700 return to step 705.

Figure 8:
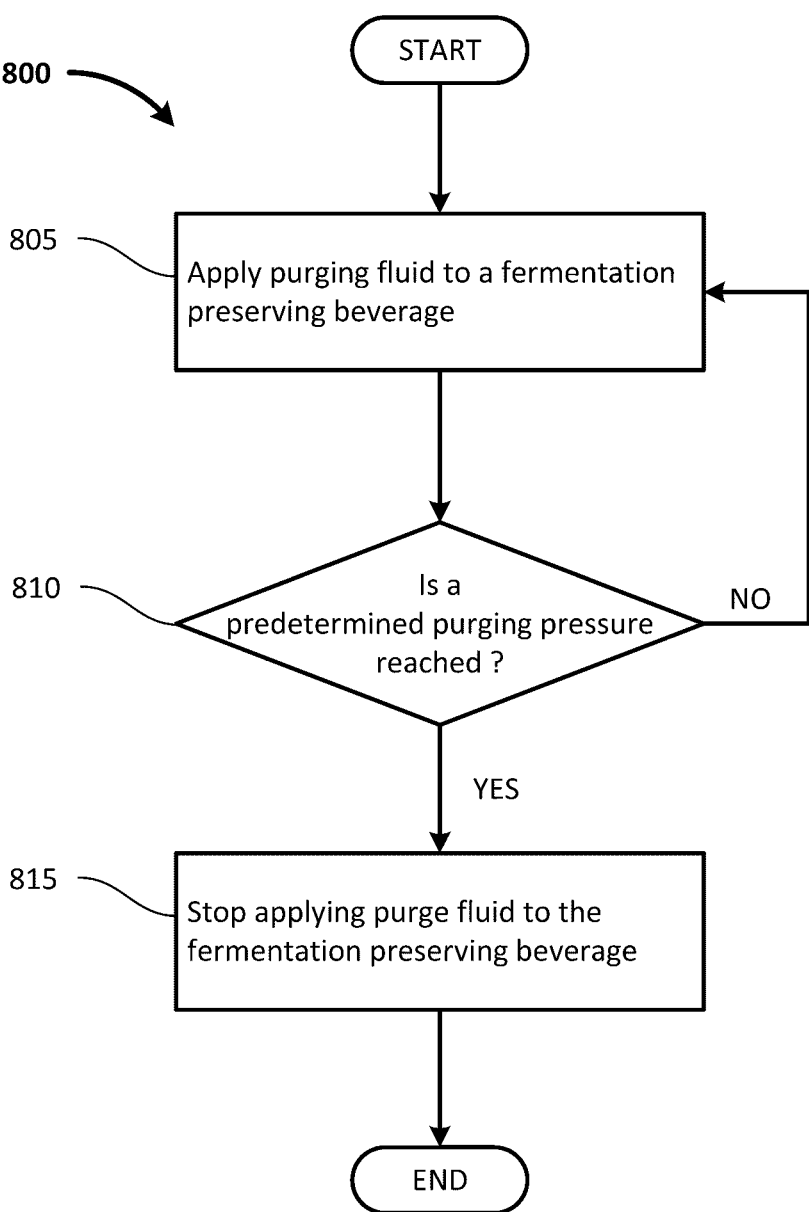
FIG. 8 is a flow diagram showing an exemplary purging method using the FMS.

FIG. 8 is a flow diagram showing an exemplary purging method 800 using the FAS 100. In some implementations, the FMC 115 may be used in a preservation mode. For example, the bottle 105 may include a port for applying a purging fluid (e.g., nitrogen gas). In this example, the method 800 starts when a purging fluid is applied to a fermentation preserving beverage 805. The purging fluid may, for example, enter the port and escape through the fluid communication channels 140.

Next, it is determined whether a predetermined purging pressure reached 810. In some implementations, the fluid well 125 may provide a visual indication when a predetermined purging pressure has reached during purging. In some examples, the predetermined purging pressure threshold may, for example, allow a pressure to be reached to drive an existing fluid (e.g., oxygen) out of the enclosed chamber 155. If it is determined that the predetermined purging pressure has not reached, then the step 805 is repeated. If it is determined that the predetermined purging pressure has been reached, then the purge fluid is stopped to apply to the fermentation preserving beverage 815 and the method 800 ends. As soon as the purging fluid ceases being applied, for example, the umbrella valve 150 may close, preserving a positive pressure in the bottle 105. For example, the positive pressure may prevent oxygen from diffusing into the bottle 105.

Although various embodiments have been described with reference to the figures, other embodiments are possible.

In some implementations, other types of stopping valves may be used in place of the umbrella valve 150. For example, the FMC 115 may include a stopping valve having a preloaded tension such that the escaping gas 160 may flow through the stopping valve when the gas pressure in the enclosed chamber 155 has reached the predetermined threshold.

Although an exemplary system has been described with reference to FIGS. 1-4, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various ous examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an illustrative aspect, a fermentation monitoring apparatus may include a vessel cap. The vessel cap may include a first chamber defining a fluid well configured to hold a quantity of fluid. The vessel cap may include at least one fluid communication channel. The vessel cap may include a stopping valve configured to substantially cover an aperture corresponding to each of the at least one fluid communication channel. The vessel cap may be configured such that, when the vessel cap is coupled to a first end of a vessel to define a second chamber, a quantity of fluid is disposed in the fluid well, and a gas pressure in the second chamber exceeds a predetermined threshold, then the stopping valve permits gas to escape, through the at least one fluid communication channel, into the fluid well, and the escaping gas forms bubbles in the quantity of fluid in the fluid well to provide visual indication to a user that the gas has exceeded the predetermined threshold.

The fermentation monitoring apparatus may include a cover configured to substantially cover the fluid well. The cover may include a selectively permeable membrane such that a liquid content in the fluid well is prevented from escaping the fluid well, and gaseous content in the fluid well is permitted to escape the fluid well through the selectively permeable membrane.

The fermentation monitoring apparatus may include a crown cap configured to be applied to substantially cover the fluid well after a completed fermentation process. When the crown cap is applied, the crown cap may substantially seal the vessel cap to prevent fluid communication between the second chamber and an exterior of the vessel via the at least one fluid communication channel and the fluid well.

The fermentation monitoring apparatus may include a tasting lid releasably coupled to the vessel cap in sealing occlusion of a second fluid communication channel between an exterior of the vessel cap and the second chamber. The tasting lid may be configured such that, when the tasting lid is removed, fluid communication is established to contents of the second chamber via the second fluid communication channel.

The fermentation monitoring apparatus may include a residue collection chamber releasably coupled to a second end of the vessel to selectively collect residue form the second chamber. The residue collection chamber may include a false bottom configured to selectively allows a residue in the chamber to flow into the chamber. The residue collection chamber may include a residue valve selectively substantially preventing fluid flow between the chamber and the residue collection chamber such that, when the gas pressure in the chamber exceeds the predetermined threshold, the residue valve stops to prevent a residue to flow into the chamber and the residue is collected in the residue collection chamber.

The fermentation monitoring apparatus may include a starter kit. The starter kit may include a quantity of fermentation catalyst, and content for fermentation.

The fermentation monitoring apparatus may include at least one sensor and a wireless communication module configured such that data received from the sensor is transmitted to a remote device. The at least one sensor may include a temperature sensor.

In an illustrative aspect, a fermentation monitoring apparatus may include a vessel cap. The vessel cap may include a fluid well holding a quantity of fluid. The vessel cap may include at least one fluid communication channel configured, such that, when the vessel cap is coupled to a first end of a vessel to define a chamber and a gas pressure in the chamber exceeds a predetermined threshold, then the fluid well receives gas released from the channel via the at least one fluid communication channel such that a visual indicium of gas bubbles is formed at in the quantity of fluid indicating that the gas pressure in the chamber has exceeded the predetermined threshold.

The fermentation monitoring apparatus may include a stopping valve configured to substantially cover an aperture corresponding to each of the at least one fluid communication channel and prevent fluid communication between the chamber and the fluid well. When the gas pressure in the chamber exceeds the predetermined threshold, the stopping valve may be configured to open such that the fluid communication between the chamber and the fluid well is established.

The fluid well may include a cover of selectively permeable membrane such that a selected content in the vessel is prevented from flowing out of the vessel, and other content in the vessel is allowed to traverse through the selectively permeable membrane.

The fermentation monitoring apparatus may include a crown cap to be applied after a completed fermentation process. The crown cap may substantially enclose the vessel cap to preserve a fermented content in the chamber.

The fermentation monitoring apparatus may include a tasting lid releasably coupled to the chamber such that, when the tasting lid is removed, a fluid communication channel is established to content within the channel.

The fermentation monitoring apparatus may include a residue collection chamber releasably coupled to a second end of the vessel to selectively collect residue form the chamber. The residue collection chamber may include a false bottom configured to selectively allow a residue in the chamber to flow into the chamber. The residue collection chamber may include a residue valve substantially preventing a flow channel between the chamber and the residue collection chamber such that, when the gas pressure in the chamber exceeds the predetermined threshold, the residue valve operates to prevent a residue to flow into the chamber and the residue is collected in the residue collection chamber.

The fermentation monitoring apparatus may include a starter kit. The starter kit may include a quantity of fermentation catalyst, and content for fermentation.

In an illustrative aspect, a vessel cap may include a fluid well. The vessel cap may include an umbrella valve. The umbrella valve may include a diaphragm and a retention module. An outer circumference of the diaphragm may define a circle in a first plane. In a non-deployed mode, the retention module may be configured to be resting above the first plane such that, when the umbrella valve is coupled to the fluid well, the umbrella valve is preloaded with a predetermined tension.

The vessel cap may be coupled to a first end of a vessel to define a chamber. The umbrella valve may operate in a gas retention mode such that the umbrella valve substantially prevents fluid communication between the chamber and the fluid well. When a gas pressure in the chamber exceeds a predetermined threshold, the umbrella valve may operate in a gas release mode such that the umbrella valve allows the fluid communication between the chamber and the fluid well to be established. After the gas pressure is reduced below the predetermined threshold, the umbrella valve may return to the gas retention mode.

The umbrella valve may be replaceable with a different hardness valve associated with a different predetermined tension corresponding to a user-selected predetermined threshold.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A fermentation monitoring apparatus comprising a drinking bottle cap, the drinking bottle cap comprising:
   a first chamber defining a fluid well configured to hold a quantity of fluid;
   at least one fluid communication channel; and,
   a stopping valve configured to substantially cover an aperture corresponding to each of the at least one fluid communication channel,
   wherein the drinking bottle cap is configured such that, when the drinking bottle cap is coupled to a first end of a vessel to define a second chamber, a quantity of fluid is disposed in the fluid well, and a gas pressure in the second chamber exceeds a predetermined threshold, then the stopping valve permits gas to escape, through the at least one fluid communication channel, into the fluid well, and the escaping gas forms bubbles in the quantity of fluid in the fluid well to provide visual indication to a user that the gas has exceeded the predetermined threshold.

2. The fermentation monitoring apparatus of claim 1, further comprising a cover configured to substantially cover the fluid well, the cover comprising a selectively permeable membrane such that a liquid content in the fluid well is prevented from escaping the fluid well, and gaseous content in the fluid well is permitted to escape the fluid well through the selectively permeable membrane.

3. The fermentation monitoring apparatus of claim 1, further comprising a crown cap configured to be applied to substantially cover the fluid well after a completed fermentation process, wherein, when the crown cap is applied, the crown cap substantially seals the drinking bottle cap to prevent fluid communication between the second chamber and an exterior of the vessel via the at least one fluid communication channel and the fluid well.

4. The fermentation monitoring apparatus of claim 1, further comprising a tasting lid releasably coupled to the drinking bottle cap in sealing occlusion of a second fluid communication channel between an exterior of the drinking bottle cap and the second chamber, the tasting lid configured such that, when the tasting lid is removed, fluid communication is established to contents of the second chamber via the second fluid communication channel.

5. The fermentation monitoring apparatus of claim 1, further comprising a starter kit, wherein the starter kit comprises: a quantity of fermentation catalyst, and content for fermentation.

6. The fermentation monitoring apparatus of claim 1, further comprising at least one sensor and a wireless communication module configured such that data received from the sensor is transmitted to a remote device.

7. The fermentation monitoring apparatus of claim 6, wherein the at least one sensor comprises a temperature sensor.

8. A fermentation monitoring apparatus comprising a drinking bottle cap, wherein the drinking bottle cap comprises:

a fluid well holding a quantity of fluid; and, at least one fluid communication channel configured, such that, when the drinking bottle cap is coupled to a first end of a vessel to define a chamber and a gas pressure in the chamber exceeds a predetermined threshold, then the fluid well receives gas released from the channel via the at least one fluid communication channel such that a visual indicium of gas bubbles is formed at in the quantity of fluid indicating that the gas pressure in the chamber has exceeded the predetermined threshold.

9. The fermentation monitoring apparatus of claim 8, further comprising a stopping valve configured to substantially cover an aperture corresponding to each of the at least one fluid communication channel and prevent fluid communication between the chamber and the fluid well, wherein, when the gas pressure in the chamber exceeds the predetermined threshold, the stopping valve opens such that the fluid communication between the chamber and the fluid well is established.

10. The fermentation monitoring apparatus of claim 8, wherein the fluid well comprises a cover of selectively permeable membrane such that a selected content in the vessel is prevented from flowing out of the vessel, and other content in the vessel is allowed to traverse through the selectively permeable membrane.

11. The fermentation monitoring apparatus of claim 8, further comprising a crown cap to be applied after a completed fermentation process, wherein the crown cap substantially encloses the drinking bottle cap to preserve a fermented content in the chamber.

12. The fermentation monitoring apparatus of claim 8, further comprising a tasting lid releasably coupled to the chamber such that, when the tasting lid is removed, a fluid communication channel is established to content within the channel.

13. The fermentation monitoring apparatus of claim 8, further comprising a starter kit, wherein the starter kit comprises a quantity of fermentation catalyst, and content for fermentation.

14. A drinking bottle cap, comprising:

a fluid well; and, an umbrella valve comprising a diaphragm, a tapering tip, and a retention module, wherein:

an outer circumference of the diaphragm defines a circle in a first plane, and, in a non-deployed mode, the retention module is resting above the first plane such that, when the umbrella valve is coupled to the fluid well, the umbrella valve is preloaded with a predetermined tension configured to pull the retention module through a wall of the fluid well; and, upon pulling the retention module through the wall, the tapering tip engages with a valve receiving aperture.

15. The drinking bottle cap of claim 14, wherein, when the drinking bottle cap is coupled to a first end of a vessel to define a chamber, the umbrella valve operates in a gas retention mode such that the umbrella valve substantially prevents a flowing communication between the chamber and the fluid well, when a gas pressure in the chamber exceeds a predetermined threshold, the umbrella valve operates in a gas release mode such that the umbrella valve allows the flowing communication between the chamber and the fluid well to be established, and after the gas pressure is reduced below the predetermined threshold, the umbrella valve returns to the gas retention mode.

16. The drinking bottle cap of claim 15, wherein the umbrella valve is replaceable with a different hardness valve associated with a different predetermined tension corresponding to a user-selected predetermined threshold.

* * * * *